F. KIELY.
BAKING POWDER TESTER.
APPLICATION FILED MAY 10, 1909.
940,258.
Patented Nov. 16, 1909.
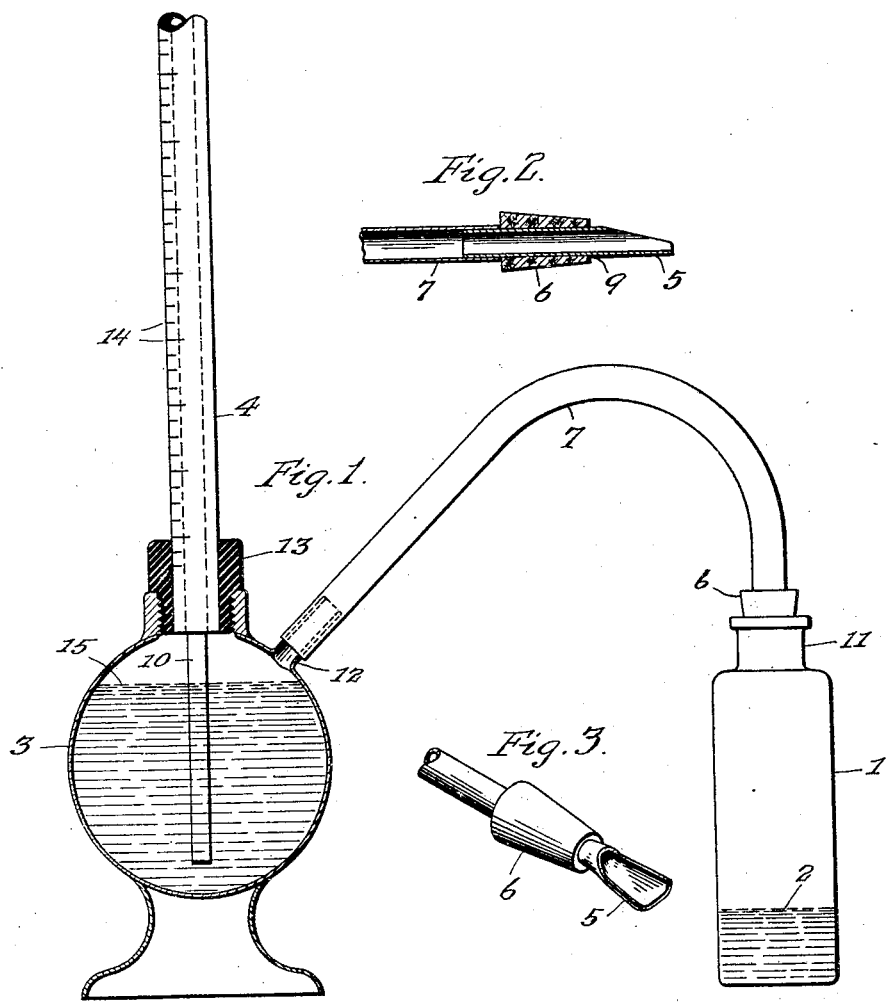
Witnesses.
Geo. J. Huting.
Louis W. Gratz.
Inventor.
Francis Kiely.

UNITED STATES PATENT OFFICE.

FRANCIS KIELY, OF LOS ANGELES, CALIFORNIA.

BAKING-POWDER TESTER.

940,258.

Specification of Letters Patent.　Patented Nov. 16, 1909.

Application filed May 10, 1909.　Serial No. 495,187.

*To all whom it may concern:*

Be it known that I, FRANCIS KIELY, a citizen of the United States, residing at Los Angeles, in the county of Los Angeles and State of California, have invented a new and useful Baking-Powder Tester, of which the following is a specification.

This invention relates to a device for testing the strength or purity of baking powders, the object of the invention being to provide a convenient, simple and cheap apparatus for this purpose.

The accompanying drawings illustrate the invention, and referring thereto: Figure 1 is a side elevation of the apparatus in condition for use. Fig. 2 is a longitudinal section of the measuring spoon and coupling for connection to the gas generator. Fig. 3 is a perspective of the spoon and coupling.

The apparatus comprises a generator consisting, for example, of a bottle or generating vessel 1 of any suitable shape and size adapted to contain hot water indicated at 2; a volumetric device consisting, for example, of a vessel 3 and a measuring tube 4 connected thereto; a measuring device consisting of a spoon 5 and coupling 6 for connecting the same to the generator 1, and a tubular connection 7 connecting the spoon to the vessel 3.

The spoon 5, which may be of any suitable material, is formed as an enlargement on a tubular stem or shank 9 fitting within a cork or stopper 6 adapted to enter and fit the neck 11 of the bottle 1. The rear end of this stem or shank extends beyond the cork and is connected to the tubular connection 7 which may be of a tube of soft rubber, the other end of said tube being slipped onto a neck 12 on the vessel 3 at the upper portion thereof.

The vessel 3 may consist of a glass globe or other suitably formed chamber having a screw cap 13 through which extends and fits the measuring tube 4 of glass, said measuring tube being graduated as at 14 and having a downward extension 10 which extends nearly to the bottom of the vessel 3, so that its lower end is immersed in a body of liquid, indicated at 15, contained in said vessel.

The device is used as follows: The spoon 5 is charged with a definite amount of baking powder, either by dipping it into the can, or by placing thereon a definite weighed amount, and the spoon is then inserted in the neck 11 of the generator or bottle 1, the cork or stopper 6 being forced into said neck to fit tightly therein. As the spoon is brought to vertical position in this operation the baking powder is discharged therefrom and falls into the water in bottle 1 and the action of the water on the baking powder generates gas therefrom, said gas passing through the tubular stem or shank 9 of the sleeve and the tube 7 to the vessel 3, where it displaces an amount of water corresponding to the amount of gas generated, this amount being indicated by the rise of the liquid in the measuring tube 4, so that from the reading on the scale 14 the strength of the baking powder can be estimated.

What I claim is:

A baking powder tester comprising a gas generating vessel formed with an opening, a spoon formed with a tubular stem said spoon opening downwardly so as to discharge its contents when the stopper is placed in the opening of said vessel and with a stopper around said stem, said stopper adapted to slidably fit said opening and removable therefrom and said spoon being smaller than said opening so as to be insertible therethrough, a gas measuring device comprising a vessel for containing liquid, a measuring tube adapted to extend into said liquid and provided with a scale, and a tube connecting said vessel of the gas generator with the said vessel of the measuring device.

In testimony whereof, I have hereunto set my hand at Los Angeles, California, this 15th day of May, 1909.

FRANCIS KIELY.

In presence of—
　ARTHUR P. KNIGHT,
　FRANK L. A. GRAHAM.